United States Patent
Perillo

(10) Patent No.: US 6,356,061 B1
(45) Date of Patent: Mar. 12, 2002

(54) FULLY INTEGRATED LINEAR REGULATOR WITH DARLINGTON BIPOLAR OUTPUT STAGE

(75) Inventor: Leonardo Perillo, Palo del Colle (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/488,953

(22) Filed: Jan. 21, 2000

(30) Foreign Application Priority Data

Jan. 21, 1999 (EP) .............................................. 99830018

(51) Int. Cl.[7] ................................................ G05F 1/40
(52) U.S. Cl. ........................ 323/274; 323/276; 323/281
(58) Field of Search ................................. 323/273, 901, 323/281, 265, 234, 274, 276; 307/44, 45, 46, 64, 66; 363/49, 89

(56) References Cited

U.S. PATENT DOCUMENTS 5,764,042 A  9/1998 Beier et al. .................. 323/316

Primary Examiner—Peter S. Wong
Assistant Examiner—Gary L. Laxton
(74) Attorney, Agent, or Firm—Jenkens + Gilchrist PC

(57) ABSTRACT

The present invention includes a linear regulator with a Darlington bipolar output stage. The linear regulator includes a starting circuit, an output stage, and a reference voltage generator connected to a control loop. The starting circuit has output terminals connected to current sources and an input terminal connected to an input reference terminal of the linear regulator via a transistor of the PNP-type. The output stage includes two Darlington-connected transistors. The reference voltage generator supplies a voltage value approximately equal to the chosen output voltage value of the linear regulator. The control loop is configured as a voltage follower, which receives a reference voltage value from the reference voltage generator.

30 Claims, 9 Drawing Sheets

FULLY INTEGRATED LINEAR REGULATOR WITH DARLINGTON BIPOLAR OUTPUT STAGE

BACKGROUND OF THE PRESENT INVENTION

1. Field of the Invention

The present invention relates to a fully integrated linear regulator with a Darlington bipolar output stage that may be suitable for applications such as a floating power supply for lead batteries.

2. Description of the Related Art

It is known that regulators of the fixed type, i.e., with a preset output voltage, are commonly used and are aimed at applications, such as a floating power supply for lead batteries usable for example within uninterruptible power supplies for electronic computers and the like.

FIG. 1 is an exemplary diagram of a potential application of a conventional linear regulator used as a floating power supply for a lead battery. The linear regulator 1 is connected to terminals 2 of a power supply with a transformer 3 and a rectifying and filtering means 4 interposed therebetween.

The linear regulator 1 has an input voltage terminal 5 and output voltage terminal 6. An output voltage Vout on the output voltage terminal 6 of the regulator 1 is set by a pair of resistors RA and RB and is capable of being fine-adjusted during production by a trim resistor TR1. At the output voltage terminal 6 of the regulator 1, there is also a diode D5 designed to prevent, when an input voltage Vin on input voltage terminal 5 is floating, battery 7 from discharging across the pair of resistors RA and RB and across the regulator 1.

FIG. 2 is a block diagram of the linear regulator 1a with an output stage provided by an NPN Darlington transistor configuration. In particular, FIG. 2 is a view of a situation in which the input voltage Vin on input voltage terminal 5 of the linear regulator 1a is left to float because the main power supply is not present.

In this floating input voltage Vin situation, the emitter-base junction of the NPN transistor Q3 sees a voltage that is higher than the breakdown voltage of the NPN transistor Q3 and undergoes a Zener breakdown. When the Zener breakdown occurs, a forward-biased base-collector junction results and a DC path toward starting circuit 8 is formed. At this point, the starting circuit 8 operates to activate current sources Iref1, Iref2 and Iref3, which begin to draw more current to the collector of the transistor Q3, thus further increasing reverse current Irev discharged from the battery 7.

The presence of the diode D5 arranged at the output of the linear regulator 1 greatly limits the reverse current Irev. However, it should be noted that such a circuit solution of the discrete type has some drawbacks.

First of all, there is the drawback of a high cost, which is due basically to the presence of the trim resistor TR1 and of the diode D5 arranged at the output voltage terminal 6 of the linear regulator 1 (see FIG. 1), which must be sized in order to withstand all the charging current of the battery 7. Moreover, there is a cost due to the time required to adjust the output voltage Vout.

The electrical performance of the conventional linear regulator is degraded because, from a thermal standpoint, the presence of the diode D5 arranged at the output voltage terminal 6 of the linear regulator 1 significantly degrades the thermal coefficient of the output voltage terminal 6 of the linear regulator 1 and also drastically degrades load regulation in the operable range of the output current. Integration of the diode D5 in silicon, in addition to the resistors RA and RB, is not convenient, both due to the above-mentioned problems and because an enormous increase in silicon area would be required due to the high current capacity required.

On the other hand, providing integrated diodes with a blocking capacity that is higher than the intended output voltage Vout on output voltage terminal 6 can be difficult. This is so because if it is necessary to use a low-cost bipolar type diode, the available diodes have base-emitter junctions that can only withstand, in reverse mode, an output voltage Vout that is lower than the intended output voltage Vout on output voltage terminal 6 of the linear regulator 1.

SUMMARY OF THE INVENTION

The present invention includes a linear regulator with a Darlington bipolar output stage. The linear regulator includes a starting circuit, an output stage, and a reference voltage generator connected to a control loop. The starting circuit has output terminals connected to current sources and an input terminal connected to an input reference terminal of the linear regulator via a transistor of the PNP-type. The output stage includes two Darlington-connected transistors, and an emitter terminal of the second of the two Darlington-connected transistors being connected to the output voltage terminal of the linear amplifier. The reference voltage generator supplies a voltage value approximately equal to the chosen output voltage value of the linear regulator. The control loop is configured as a voltage follower and includes an error amplifier, the positive input terminal of the error amplifier being connected to the reference voltage generator, the inverting input terminal of the error amplifier being connected to the output voltage terminal of the linear regulator, and the output terminal of the error amplifier being connected to the output stage.

In operation, the linear regulator provides a regulated voltage to a battery terminal while the input voltage terminal of the linear regulator receives an input voltage from a main power supply. If the input voltage terminal of the linear regulator fails to receive the input voltage from the main power supply, the voltage regulator stops regulating, essentially, and isolates the battery so that the system being regulated continues to receive power from the battery rather than the linear regulator.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
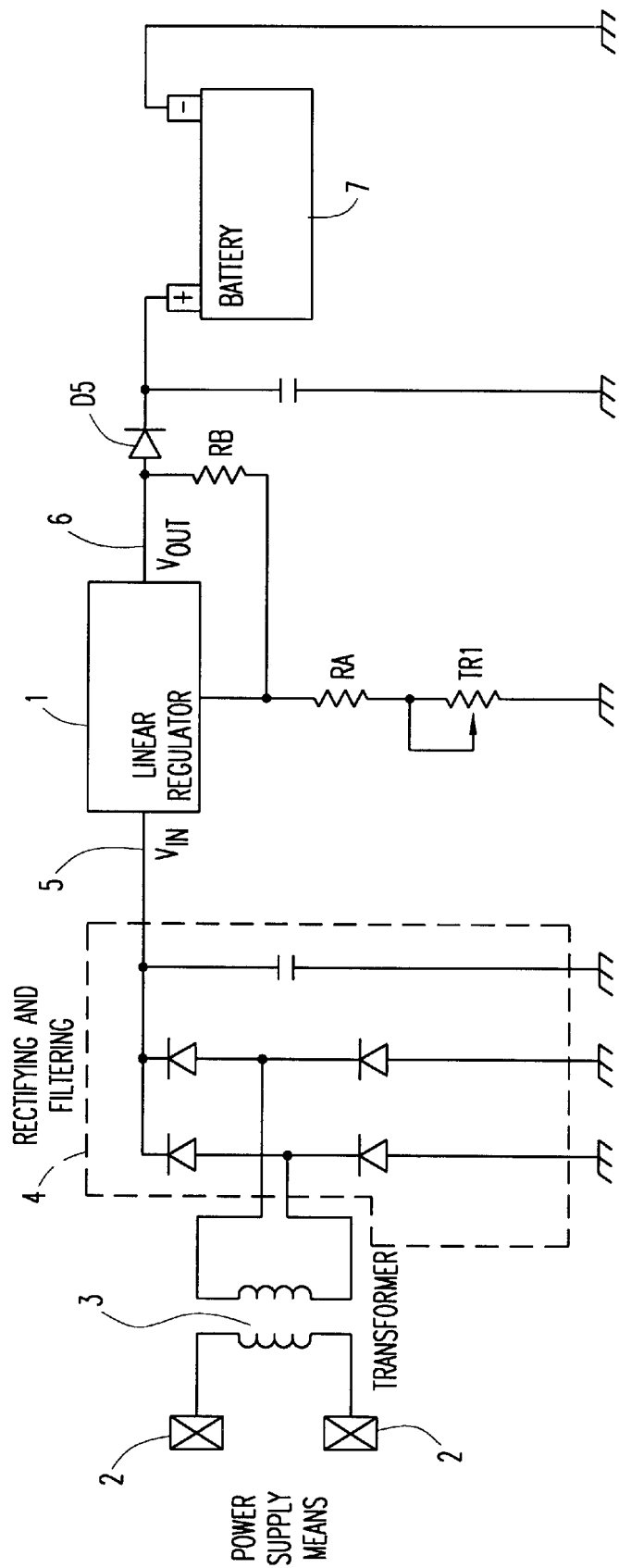
FIG. 1 is a diagram of an application in which a linear regulator may be utilized.
Figure 2:
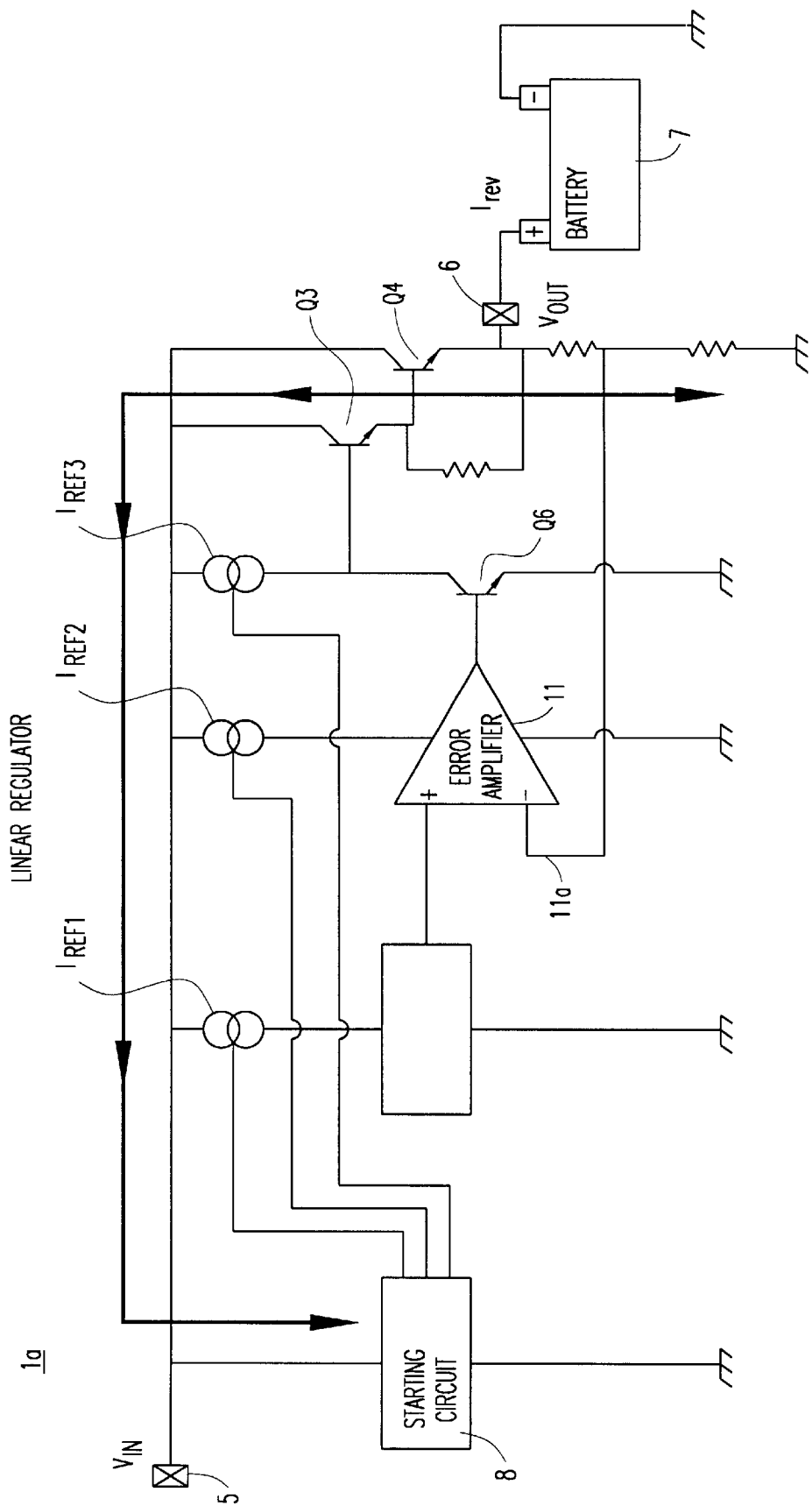
FIG. 2 is a block diagram of the conventional linear regulator.
Figure 3:
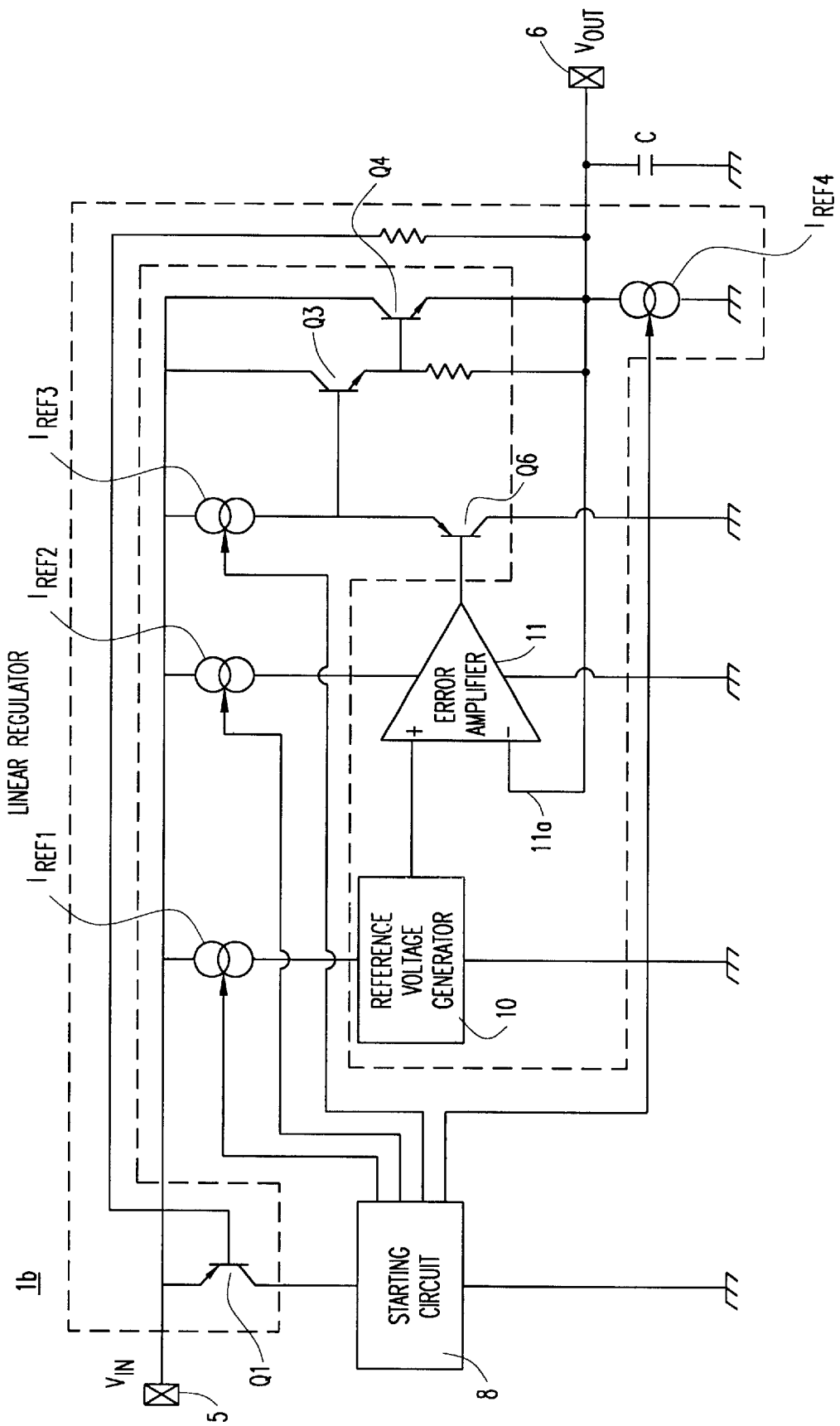
FIG. 3 is a first embodiment block diagram of a linear regulator according to the present invention.

Since FIGS. 1 and 2 have already been described, they are not discussed further herein, with the provision that identical reference numerals in FIGS. 1–3 designate identical elements.

Therefore, to better understand the invention, FIG. 3 has been given reference numerals which are identical to those of FIGS. 1 and 2 to indicate common elements in order to highlight the innovative differences proposed in the present invention.

Accordingly with reference to FIG. 3, which is a block diagram of a linear regulator 1b according to a first embodiment of the present invention, the linear regulator 1b is shown in a condition in which the input voltage Vin on input voltage terminal 5 may be left to float, i.e., when a main power supply is not present for any reason.

The particularity of the present invention is that rather than having the external diode D5 and the two resistors RA and RB as shown in FIG. 1, the linear regulator 1b has a reference voltage generator 10 which connects to an adjustment or control loop in a voltage-follower configuration. The reference voltage generator 10 generates a reference voltage that is equal to the intended output voltage Vout, which may be approximately 13.7V an exemplary application.

The control loop comprises error amplifier 11, which has its output connected to a base terminal of a bipolar transistor Q6 of the PNP type and a pair of transistors connected in a Darlington configuration. A collector terminal of the bipolar transistor Q6 is connected to ground and an emitter terminal of the bipolar transistor Q6 is connected to a reference current source Iref 3, which, in turn, connects to starting circuit 8.

The pair of transistors Q3 and Q4 are of the NPN type and are bipolar. Current sources Iref1 and Iref2 are connected to the starting circuit 8. However, the external diode D5 and the external resistors RA and RB are no longer present in FIG. 3.

Error amplifier 11 has an inverting terminal 11a, which is part of the control loop, directly connected to the output voltage terminal 6. A transistor Q1 has an emitter terminal connected to the input voltage terminal 5 of the linear regulator 1b and has a collector terminal connected to the starting circuit 8. A resistor RST is interposed between a base terminal of transistor Q1 and the output voltage terminal 6 of the linear regulator 1b.

The output voltage terminal 6 is also connected dynamically to ground via a capacitor C and may be statically connected to a load, such as battery 7. A current source Iref4 is connected between an emitter terminal of the transistor Q4 and the starting circuit 8.

Current source Iref4 is activated directly by the starting circuit 8 and constitutes an active load for the transistor Q4. Current source Iref4 allows the linear regulator 1b to operate even in the absence of an external load. Current source Iref4 further acts to avoid introducing a resistive path typical of a voltage divider (see resistors RA and RB of FIG. 1), which is detrimental when current flows from the battery 7 toward the linear regulator 1b.

The transistor Q1, whose collector terminal is connected to a turn-on branch of the starting circuit 8, constitutes a switch that prevents the starting circuit 8 from turning on when current flows from the battery 7. The prevention of the starting circuit 8 from turning on is due to the Zener breakdown of the emitter-base junctions of transistors Q3 and Q4.

In particular, if the input voltage Vin is present on the input voltage terminal 5, the application of the input voltage Vin saturates the transistor Q1, which is of the PNP type, because the transistor Q1 has the emitter-base junction being forward-biased due to the resistor RST being connected to the output voltage terminal 6 of the linear regulator 1b. When transistor Q1 saturates, the starting circuit 8 is activated and the linear regulator 1b starts to operate. The transistor Q1 remains on due to the difference in potential between Vin and Vout. Additionally, the control loop consisting of error amplifier 11, Q6, Q3, Q4 and supported by Iref3 and Iref4 becomes active. In the active state, the control loop as a whole acts as a voltage follower (i.e., when the load current changes, it keeps the output voltage Vout on the output voltage terminal 6 at the same voltage potential, which is 13.7V in an exemplary operation, that the reference voltage generator 10 applies to a positive terminal (+) of the error amplifier 11).

Conversely, when the input voltage Vin on the input voltage terminal 5 floats, the transistor Q1 turns off and prevents the starting circuit 8 from starting. Additionally, Iref1, Iref2, Iref3, and Iref4 are turned off, thereby making all the currents null. By preventing the starting circuit 8 from starting, any resistive path which might be responsible for a second component of the previously mentioned reverse current (i.e., current flowing from battery 7) is eliminated.

The portion shown in dashed lines in FIG. 3 illustrates the circuit configuration of the linear regulator 1b according to the present invention, as distinguished from the circuitry of the linear regulator 1a shown in FIG. 2. The configuration of the linear regulator 1b makes it possible to fully integrate the linear regulator 1b into the potential application shown in FIG. 1, since the diode D5 and the resistors RA and RB are no longer externally present to the linear regulator 1b and required thereby.

The present invention provides a fixed-voltage linear regulator 1b with a Darlington NPN output stage, characterized by a very low reverse current. The linear regulator 1b is therefore suitable, for example, for applications for providing the floating power supply of lead batteries. The solution described, according to the present invention, does not significantly entail the penalties of electrical and thermal performance observed in conventional regulator circuits, such as the linear regulator 1a shown in FIG. 2. Additionally, the present invention allows the linear regulator 1b to be fully integrated into the potential application shown in FIG. 1 because the output blocking diode D5 and the voltage divider constituted by the resistors RA and RB are eliminated from the circuitry external to the linear regulator 1b.

Figure 4:
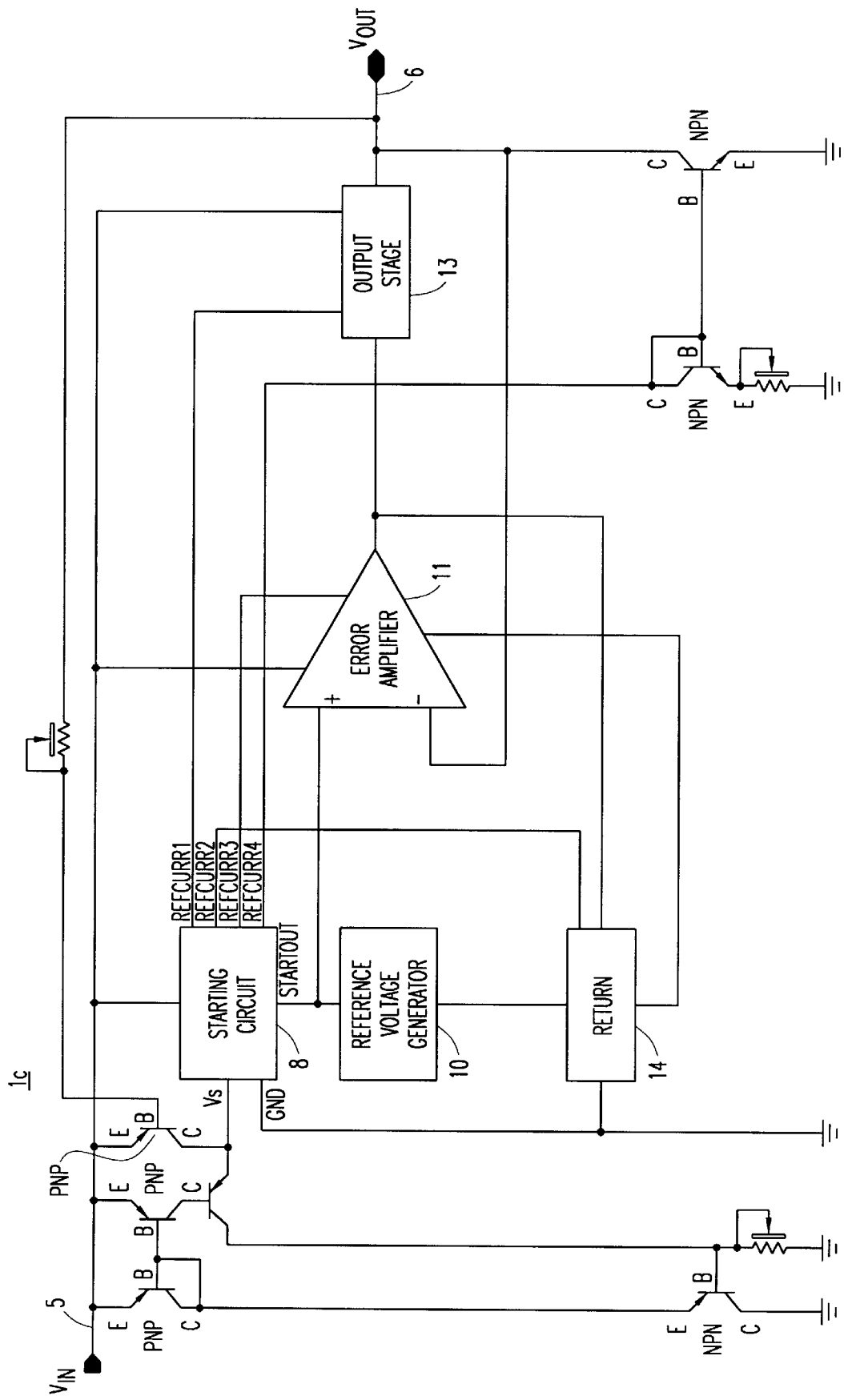
FIG. 4 is a second embodiment block diagram of the present invention.
Figure 5:
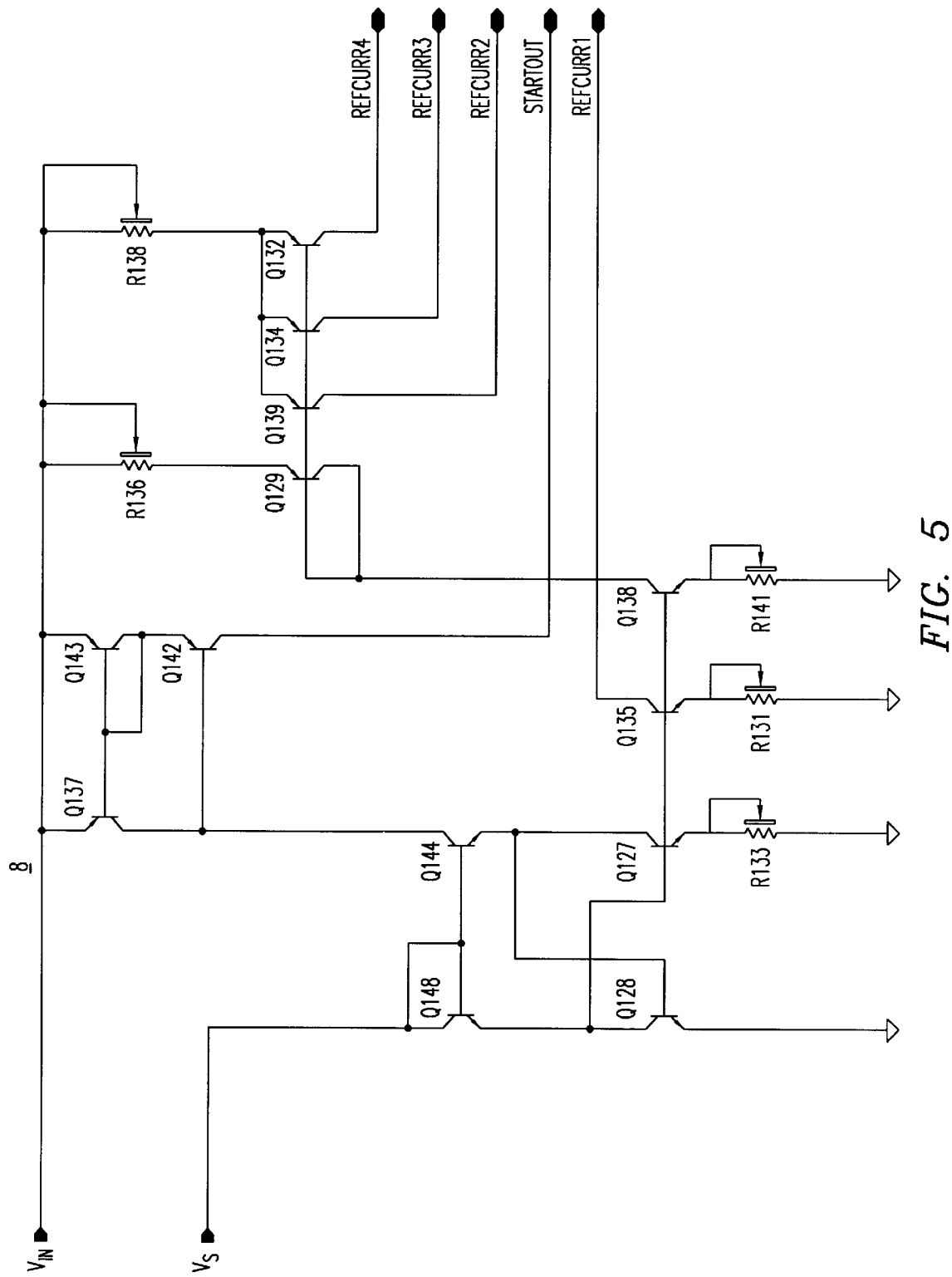
FIG. 5 is a schematic diagram of a startup block shown in FIG. 4.
Figure 6:
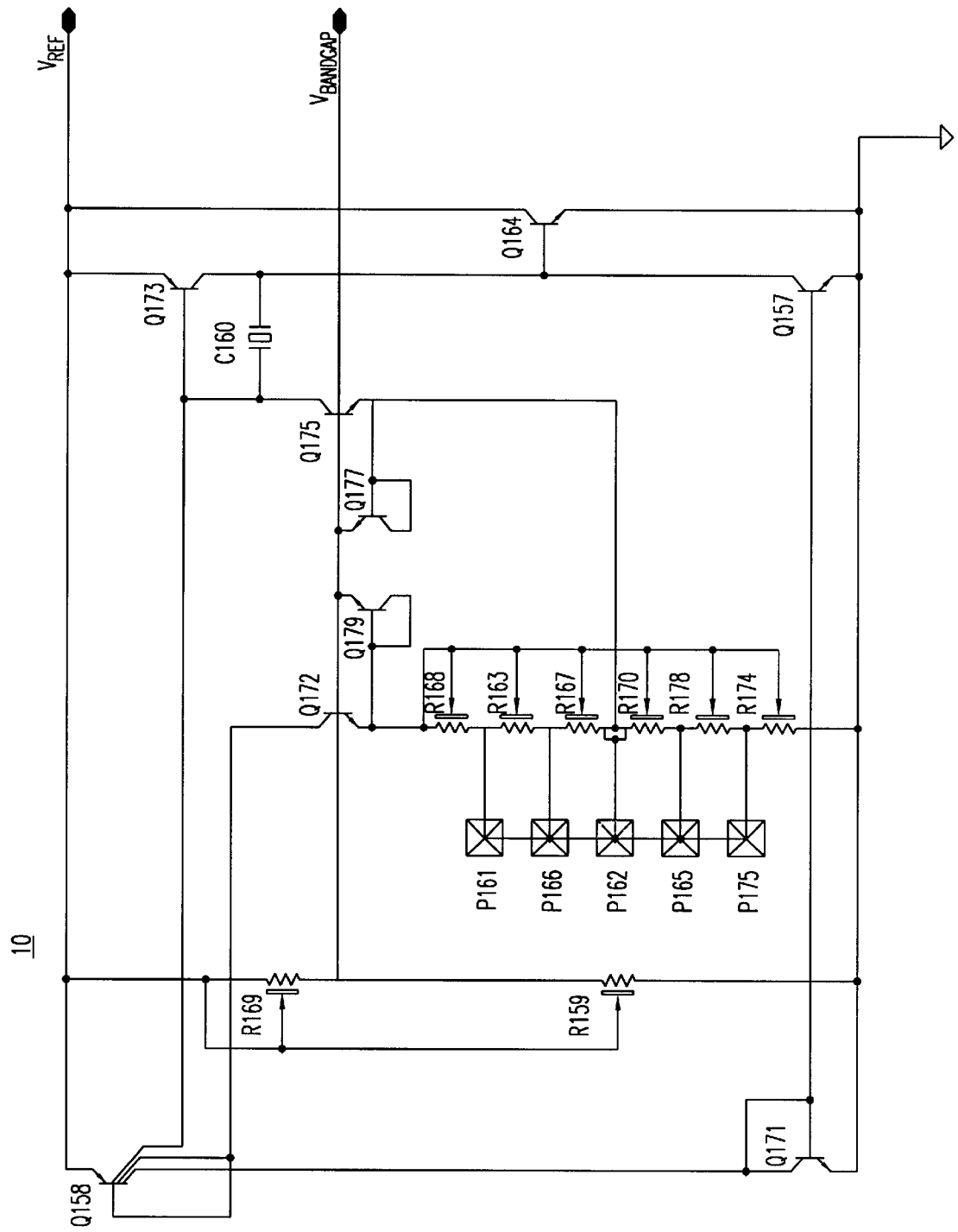
FIG. 6 is a schematic diagram of a reference block shown in FIG. 4.
Figure 7:
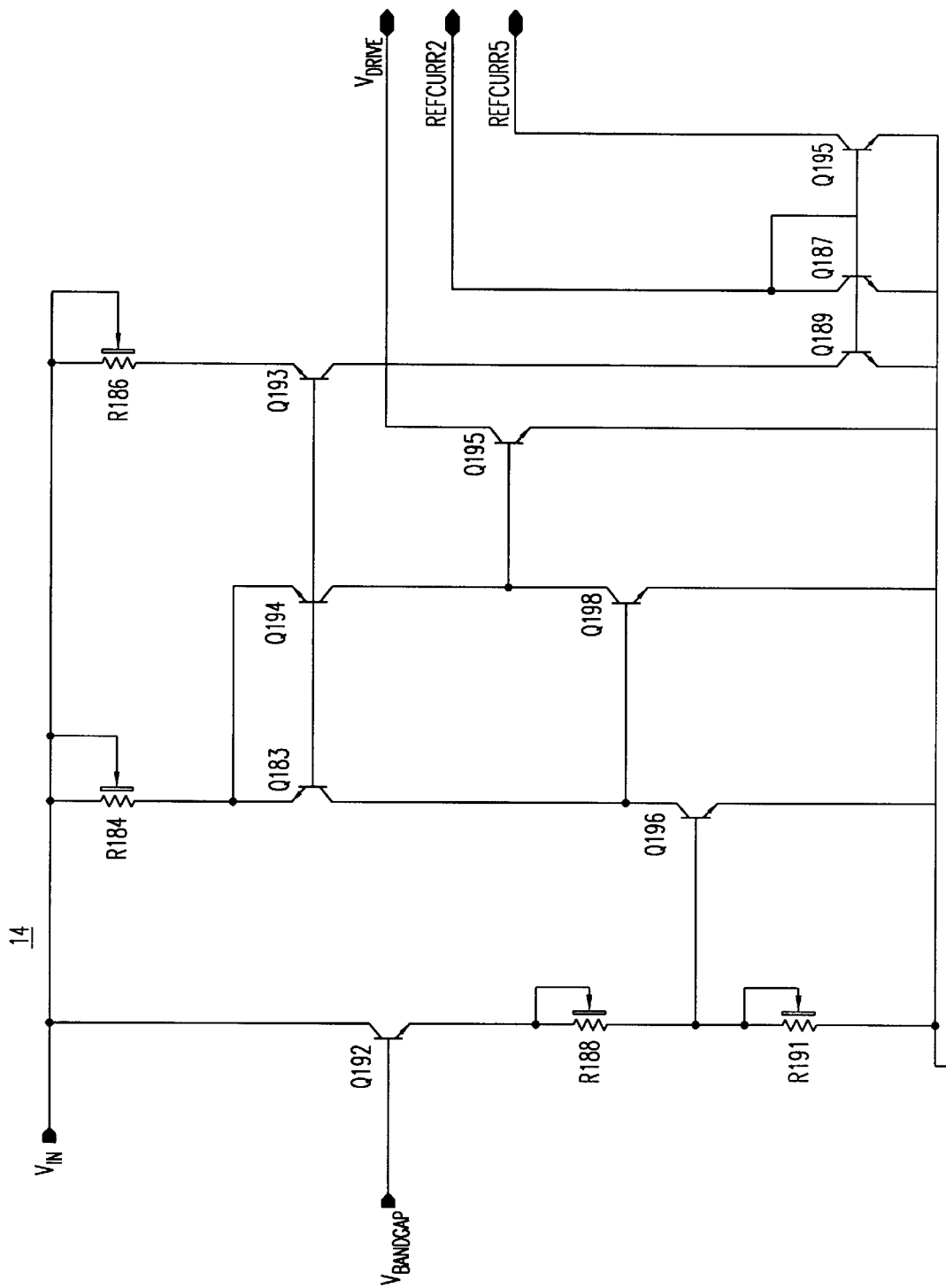
FIG. 7 is a schematic diagram of a return block shown in FIG. 4.
Figure 8:
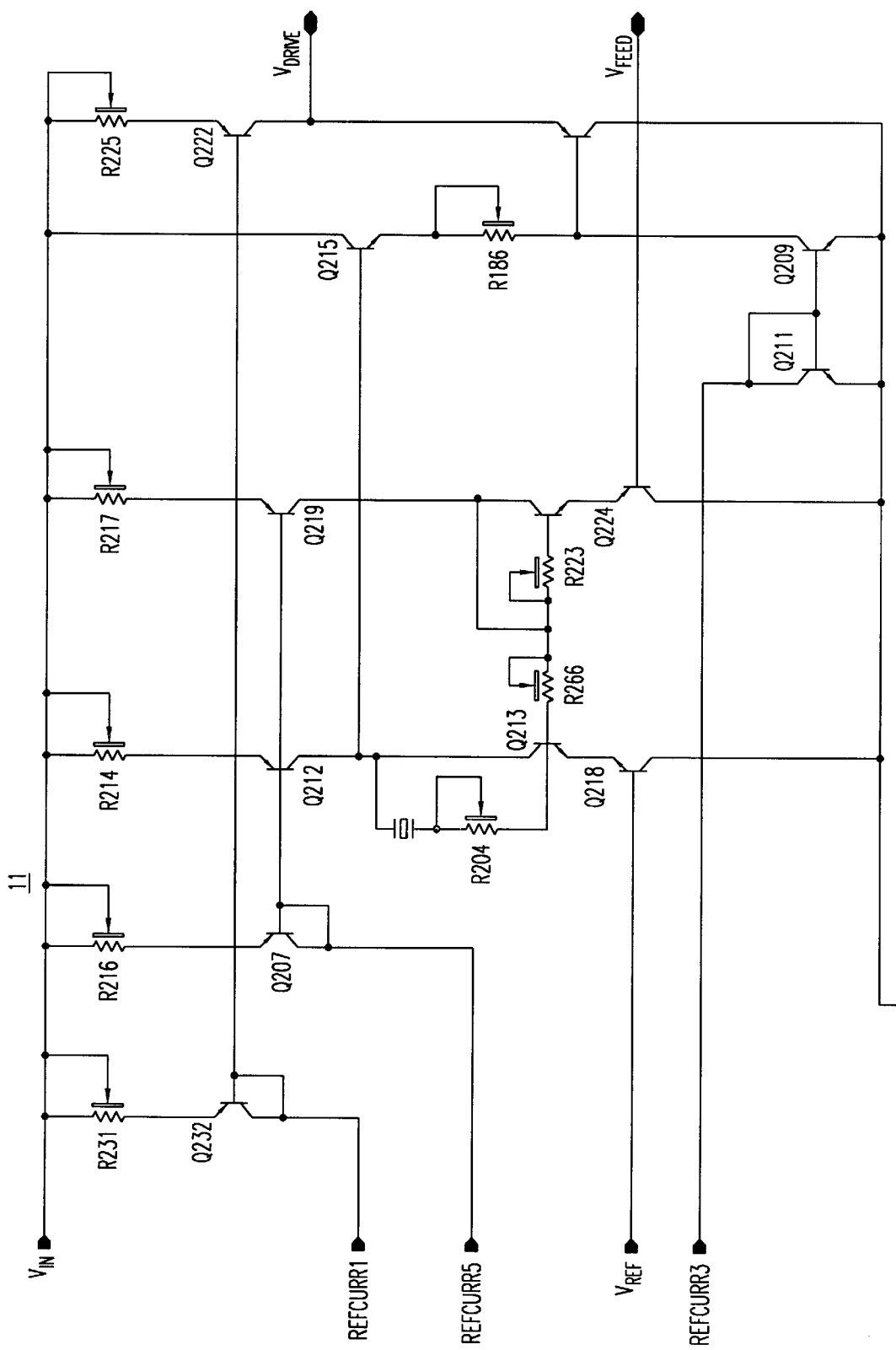
FIG. 8 is a schematic diagram of a error amplifier shown in FIG. 4.
Figure 9:
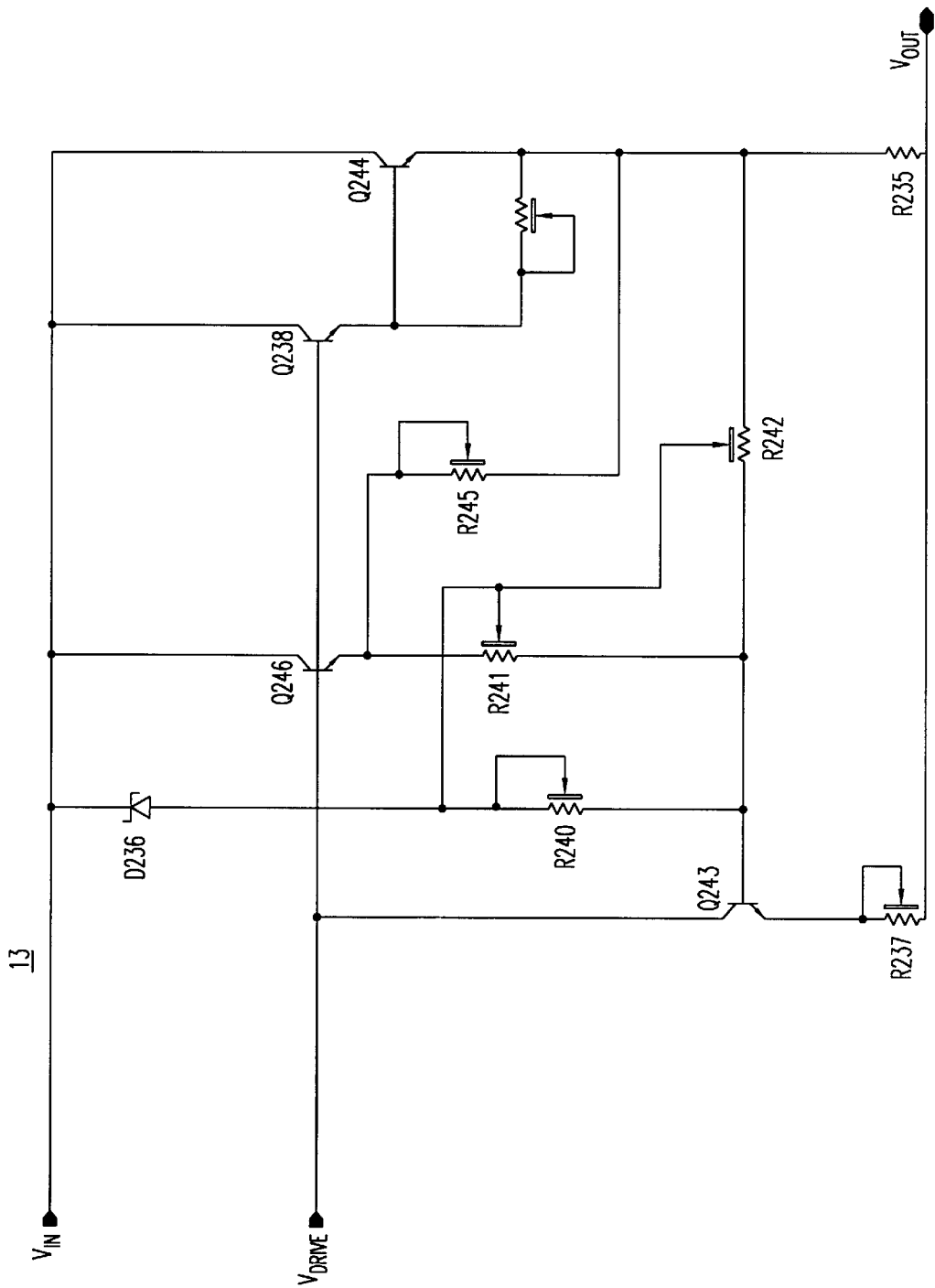
FIG. 9 is a schematic diagram of a output stage shown in FIG. 4.

FIG. 4 is a second embodiment block diagram of the linear regulator 1c according to the present invention. As shown, the starting circuit 8, reference voltage generator 10, error amplifier 11, and output stages are each included, however there are slight differences, which do not affect functionality of the present invention, with respect to FIG. 3. FIGS. 5–9 are schematic diagrams of the individual blocks and associated circuitry shown in FIG. 4.

It should be understood that the linear regulator 1b with the Darlington bipolar output stage, according to the present invention, has an extremely low reverse current, which can be easily integrated with a reduced silicon area occupation. The electrical performance of the linear regulator 1b is similar to conventional linear regulators with the diode D5 external to the linear regulator 1b. The linear regulator 1b is highly reliable and may be competitively priced due to its design.

The previous description is of a preferred embodiment for implementing the invention, and the scope of the invention should not necessarily be limited by this description. The scope of the present invention is instead defined by the following claims.

What is claimed is:

1. A linear regulator comprising:
   an input voltage terminal and an output voltage terminal;
   a plurality of current sources;
   a starting circuit connected to said input voltage terminal, said starting circuit further connected to said plurality of current sources;
   an output stage having two Darlington-connected transistors connected to said output voltage terminal;
   a reference voltage generator whose value is approximately equal to a chosen output voltage value of said linear regulator;
   a control loop configured as a voltage follower, said control loop comprising an error amplifier and said output stage, wherein said error amplifier comprises a positive input terminal connected to said reference voltage generator and an inverting input terminal connected to said output voltage terminal of said linear regulator; and
   a transistor connected between said starting circuit and said input voltage terminal of said linear regulator.

2. The linear regulator according to claim 1, further comprising a resistor connected between said output voltage terminal and a base terminal of said transistor.

3. The linear regulator according to claim 1, further comprising a capacitor electrically connecting said output terminal of said linear regulator to ground.

4. The linear regulator according to claim 1, wherein said two Darlington-connected transistors are of the NPN type.

5. The linear regulator according to claim 1, wherein said reference voltage generator is connected to a non-inverting terminal of said error amplifier.

6. The linear regulator according to claim 1, wherein said transistor is of the PNP-type.

7. The linear regulator according to claim 1, wherein one of said plurality of current sources is connected between said output voltage terminal and ground, said one of said plurality of current sources having a control terminal connected to said starting circuit to selectively turn on and turn off said one of said plurality of current sources.

8. The linear regulator according to claim 7, wherein a transistor is connected between said starting circuit and said input voltage terminal, said transistor having an emitter terminal connected to said input voltage terminal and a collector terminal connected to said starting circuit.

9. A linear regulator comprising:
   an input voltage terminal for receiving an input voltage from a main power supply;
   an output voltage terminal for supplying a regulated voltage;
   a control loop, wherein said control loop comprises:
      an output stage comprising a first and a second transistor connected in a Darlington configuration, wherein an emitter terminal of said second transistor is the output terminal of said output stage and is connected to said output voltage terminal;
      a reference voltage generator having an output terminal;
      an error amplifier, said error amplifier having a positive and a negative input terminal and an output terminal, wherein said positive input terminal is connected to said output terminal of said reference voltage generator and said negative input terminal is connected to said output voltage terminal; and
   a current source being connected between said output voltage terminal and ground, a current level passing through said current source being changed upon said input voltage from a main power supply being applied to said input voltage terminal.

10. The linear regulator according to claim 9, further comprising a transistor of the PNP-type connected to said output terminal of said error amplifier and said first transistor connected in a Darlington configuration.

11. The linear regulator according to claim 9, wherein said output voltage terminal connects to an emitter terminal of said second transistor in a Darlington configuration.

12. The linear regulator according to claim 9, wherein said current source is selectively switched to the turned on state.

13. The linear regulator according to claim 9, wherein the current level being changed transitions from off to on.

14. The linear regulator according to claim 9, further comprising a starting circuit, wherein said starting circuit comprises the same number of output terminals as the number of said plurality of current sources, each of said same number of output terminals being connected to said current sources for turning on and turning off said current sources.

15. The linear regulator according to claim 14, further comprising a transistor of the PNP-type having an emitter terminal, collector terminal, and base terminal, said emitter terminal being connected to said input voltage terminal, said collector terminal being connected to said starting circuit, and said base terminal being connected via a resistor to said output voltage terminal.

16. A linear regulator comprising:
   an input voltage terminal and an output voltage terminal;
   a starting circuit having an input terminal and a plurality of output terminals;
   a transistor operating as a switch, said transistor connected between said input voltage terminal and said starting circuit, wherein said transistor is turned on when an input voltage is supplied to said input voltage terminal and turned off when said input voltage terminal floats; and
   a reference voltage generator for providing a reference voltage to said output voltage terminal approximately equal to a desired output voltage from said linear regulator, said starting circuit selectively activating said reference voltage generator upon said transistor being turned on.

17. The linear regulator according to claim 16, further comprising an output stage comprising a pair of transistors connected in a Darlington configuration, said pair of transistors having an output terminal connected to said output voltage terminal.

18. The linear regulator according to claim 16, further comprising an error amplifier having a positive and an inverting input terminal, said positive terminal being connected to a reference voltage generator, said inverting input terminal being connected to said output voltage terminal.

19. The linear regulator according to claim 16, further comprising a resistor connected between said output voltage terminal of said linear amplifier and a control terminal of said transistor operating as a switch.

20. A method for linearly regulating a reference voltage level on an output signal, the method comprising:

receiving an input voltage;

applying a switching signal from a switch to a starter circuit for generating at least one control signal based upon the input voltage being a predetermined voltage level greater than the output signal;

generating at least one current signal in response to the initiation of the at least one control signal; and generating and controlling the reference voltage level on the output signal approximately equal to a chosen output voltage value upon the generation of the at least one current signal.

21. The method according to claim 20, wherein the predetermined voltage level is a threshold voltage of a transistor.

22. The method according to claim 21, wherein the threshold voltage is an emitter-to-base threshold voltage.

23. The method according to claim 20, further comprising:

removing the switching signal to the starter circuit based upon the input voltage being less than the predetermined voltage level.

24. A regulator for regulating a voltage level at a terminal of a battery, comprising:

a linear regulator having an input terminal and an output terminal, the output terminal being connected to a terminal of the battery independent of an electrical switching component being coupled between the output terminal of the linear regulator and the terminal of the battery, said linear regulator further including a current sink coupled to the output terminal, the current sink being selectively de-activated to substantially eliminate current flow from the terminal of the battery to the linear regulator.

25. A linear regulator comprising:

an input voltage terminal and an output voltage terminal;

a plurality of current sources, one of said plurality of current sources is connected between said output voltage terminal and ground;

a starting circuit connected to said input voltage terminal, said starting circuit further connected to said plurality of current sources, the one of said plurality of current sources having a control terminal connected to said starting circuit to selectively turn on and turn off the one of said plurality of current sources;

an output stage having two Darlington-connected transistors connected to said output voltage terminal;

a reference voltage generator whose value is approximately equal to a chosen output voltage value of said linear regulator;

a control loop configured as a voltage follower, said control loop comprising an error amplifier and said output stage, wherein said error amplifier comprises a positive input terminal connected to said reference voltage generator and an inverting input terminal connected to said output voltage terminal of said linear regulator; and a capacitor connected between said output voltage terminal and ground.

26. The linear regulator according to claim 25, further comprising a transistor connected between said starting circuit and said input voltage terminal of said linear regulator.

27. The linear regulator according to claim 25, wherein said transistor is of the PNP-type.

28. The linear regulator according to claim 26, further comprising a resistor connected between said output voltage terminal and a base terminal of said transistor.

29. The linear regulator according to claim 25, wherein said two Darlington-connected transistors are of the NPN-type.

30. The linear regulator according to claim 25, wherein said reference voltage generator is connected to a non-inverting terminal of said error amplifier.

* * * * *

UNITED STATES PATENT AND TRADEMARK OFFICE
CERTIFICATE OF CORRECTION

PATENT NO. : 6,356,061 B1  Page 1 of 1
DATED : March 12, 2002
INVENTOR(S) : Leonardo Perillo It is certified that error appears in the above-identified patent and that said Letters Patent is hereby corrected as shown below:

Drawings,
Sheet 3, Fig. 3, add -- RST -- Associated with the resistor between the base terminal of transistor Q1 and the Vout 6

Column 7,
Line 35, replace "less than the" with -- a --
Line 36, after "level" insert -- less than the output signal. --

Column 8,
Line 34, replace "claim 25" with -- claim 26 --

Signed and Sealed this

Twenty-fifth Day of March, 2003

JAMES E. ROGAN
*Director of the United States Patent and Trademark Office*